(12) United States Patent
Petruzzelli (10) Patent No.: US 10,165,312 B2
(45) Date of Patent: Dec. 25, 2018

(54) OVER-THE-AIR TELEVISION GAP FILLER USING TELEVISION-WHITE-SPACE CHANNELS VIA WIRELESS LOCAL AREA NETWORKS

(71) Applicant: DISH Technologies L.L.C., Englewood, CO (US)

(72) Inventor: Edmund F. Petruzzelli, Centennial, CO (US)

(73) Assignee: DISH Technologies L.L.C., Englewood, CO (US)

( * ) Notice: Subject to any disclaimer, the term of this patent is extended or adjusted under 35 U.S.C. 154(b) by 0 days.

(21) Appl. No.: 14/993,984

(22) Filed: Jan. 12, 2016

(65) Prior Publication Data

US 2017/0201776 A1    Jul. 13, 2017

(51) Int. Cl.
| | |
|---|---|
| *H04N 21/2385* | (2011.01) |
| *H04N 21/2343* | (2011.01) |
| *H04N 21/4363* | (2011.01) |
| *H04N 21/438* | (2011.01) |
| *H04N 21/426* | (2011.01) |
| *H04W 16/14* | (2009.01) |
| *H04H 20/02* | (2008.01) |

(52) U.S. Cl.
CPC ........ *H04N 21/2385* (2013.01); *H04H 20/02* (2013.01); *H04N 21/234336* (2013.01); *H04N 21/4263* (2013.01); *H04N 21/4382* (2013.01); *H04N 21/43637* (2013.01); *H04W 16/14* (2013.01)

(58) Field of Classification Search
CPC .................................................. H04N 21/4263
See application file for complete search history.

(56) References Cited

U.S. PATENT DOCUMENTS

| | | | |
|---|---|---|---|
| 2011/0116458 A1* | 5/2011 | Hsu ........................ | H04W 16/14 370/329 |
| 2011/0222493 A1* | 9/2011 | Mangold .............. | H04B 1/0475 370/329 |

(Continued)

OTHER PUBLICATIONS

Wikipedia, "IEEE 802.11," retrieved from https://en.wikipedia.org/wiki/IEEE_802.11, on Jan. 7, 2016, 12 pgs.

(Continued)

*Primary Examiner* — Joshua D Taylor
(74) *Attorney, Agent, or Firm* — Seed IP Law Group LLP (57) ABSTRACT

Embodiments are directed towards a television system that utilizes a host device and television receiver to receive content via over-the-air television channels where the television receiver cannot directly receive over-the-air transmissions. The television receiver selects an over-the-air channel and provides the selection to the host device. The host device selects a television-white-space channel and provides the selection to the television receiver. The host device then receives content via the selected over-the-air channel, transcodes the content into wireless local area network data packets, and provides the transcoded content to the television receiver using the selected television-white-space channel. The television receiver receives the content via the selected television-white-space channel over the wireless local area network and provides it to a display device for display to a user.

20 Claims, 5 Drawing Sheets

(56) References Cited

U.S. PATENT DOCUMENTS

| | | | | |
|---|---|---|---|---|
| 2012/0096498 A1* | 4/2012 | Wu | ................. | H04L 5/003 |
| | | | | 725/81 |
| 2012/0106464 A1* | 5/2012 | Ma | ................. | H04W 16/14 |
| | | | | 370/329 |
| 2013/0223357 A1* | 8/2013 | Jones | ................. | H04L 27/0006 |
| | | | | 370/329 |
| 2013/0294436 A1* | 11/2013 | Kim | ................. | H04W 16/14 |
| | | | | 370/338 |
| 2014/0115637 A1* | 4/2014 | Stanforth | ................. | H04W 4/02 |
| | | | | 725/62 |
| 2015/0052574 A1* | 2/2015 | Yang | ................. | H04N 21/4263 |
| | | | | 725/133 |
| 2015/0288617 A1* | 10/2015 | Dasher | ................. | H04L 47/801 |
| | | | | 709/226 |
| 2016/0112747 A1* | 4/2016 | Majid | ................. | H04N 21/4263 |
| | | | | 348/731 |

OTHER PUBLICATIONS

Wikipedia, "IEEE 802.11af," retrieved from https://en.wikipedia.org/wiki/IEEE_802.11af, on Jan. 7, 2016, 3 pgs.

Wikipedia, "White spaces (radio)," retrieved from https://en.wikipedia.org/wiki/White_spaces_(radio), Jan. 7, 2016, 8 pgs.

\* cited by examiner

OVER-THE-AIR TELEVISION GAP FILLER USING TELEVISION-WHITE-SPACE CHANNELS VIA WIRELESS LOCAL AREA NETWORKS

BACKGROUND

Technical Field

The present disclosure relates generally to providing audiovisual content to a user, and more particularly, but not exclusively, to utilizing a host device to receive over-the-air transmissions and retransmit them via television-white-space channels over a wireless local area network.

Description of the Related Art

Content distributors deliver audiovisual content to users through a variety of different systems. These systems may include over-the-air broadcast television, satellite television, and cable television. Each of these systems has advantages and disadvantages. For example, over-the-air television is generally free, but is limited to the broadcast range of the system and the terrain between the receiving antenna and the broadcast tower. On the one hand, satellite and cable television can be accessed at great distances from the distributor, but on the other hand, they are generally rather expensive.

Some people are willing to pay monthly service fees to receive a large number of television channels from a satellite or cable television distributor. But there are other people who are unwilling to pay these fees and would prefer to receive free channels via over-the-air television. Unfortunately, hills, mountains, great distances, and other obstacles can lead to poor reception of over-the-air television signals. As a result, the viewer may be unable to receive over-the-air television or the received signals may be insufficient to provide a usable image to the viewer. It is with respect to these and other considerations that the embodiments described herein have been made.

BRIEF SUMMARY

Briefly stated, embodiments are directed towards a system that provides content from over-the-air television channels to a television receiver that cannot directly receive the over-the-air transmission. A host device and the television receiver establish a wireless local area network connection between the devices. In various embodiments, the host device and television receiver communicate with one another using the IEEE 802.11af "Super Wi-Fi" standard. The television receiver selects an over-the-air channel and provides the selection to the host device. The host device selects a television-white-space channel and provides the selection to the television receiver. The host device then receives content via the selected over-the-air channel, transcodes the content into IEEE 802.11af data signals, and provides the transcoded content to the remote television receiver using the established wireless local area network connection. The television receiver receives the transcoded content and provides it to a display device for display to a user.

By utilizing a host device to capture the content from over-the-air transmissions and retransmit the content to the television receiver using television-white-space channels via Super Wi-Fi, the television receiver can access over-the-air content without having the ability to directly receive the over-the-air transmissions itself.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks and the automobile environment, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
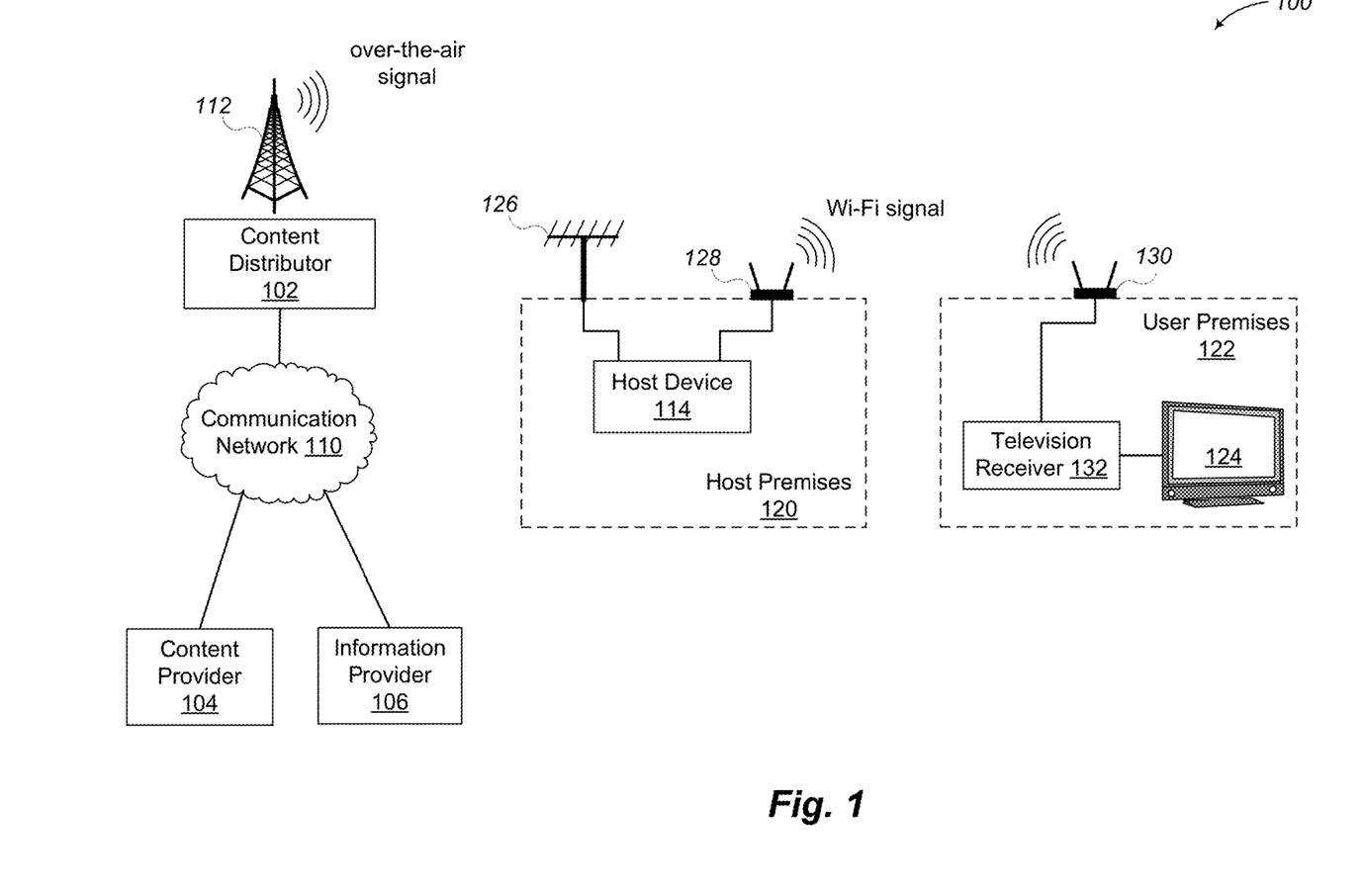
FIG. 1 illustrates a context diagram for providing audiovisual content to a user in accordance with embodiments described herein.

FIG. 1 shows a context diagram of one embodiment for providing audiovisual content to a user in accordance with embodiments described herein. Example 100 includes content provider 104, information provider 106, content distributor 102, communication networks 110, host premises 120, and user premises 122.

Communication network 110 may be configured to couple various computing devices to transmit content/data from one or more devices to one or more other devices. For example, communication network 110 may be the Internet, X.25 networks, or a series of smaller or private connected networks that carry the content. Communication network 110 may include one or more wired or wireless networks.

Typically, content providers 104 generate, aggregate, and/or otherwise provide audiovisual content that is provided to one or more users. Sometimes, content providers are referred to as "channels." Examples of content providers 104 may include, but are not limited to, film studios; television studios; network broadcasting companies; independent content producers, such as AMC, HBO, Showtime, or the like; or other entities that provide content for user consumption. The content provided by content providers 104 may be referred to as the program content, which may include movies, sitcoms, reality shows, talk shows, game shows, documentaries, infomercials, news programs, sports programs, or the like. In this context, program content may also include commercials or other television advertisements. It should be noted that the commercials may be added to the program content by the content providers 104 or the content distributor 102.

Information provider 106 may create and distribute data or other information that describes or supports audiovisual content. Generally, this data is related to the program content provided by content provider 104. For example, this data may include, for example, metadata, program name, closed-caption authoring and placement within the program content, timeslot data, pay-per-view and related data, or other information that is associated with the program content. In some embodiments, a content distributor 102 may combine or otherwise associate the data from information provider 106 and the program content from content provider 104, which may be referred to as the distributed content or more generally as content. However, other entities may also combine or otherwise associate the program content and other data together.

Content distributor 102 may provide the content, whether obtained from content provider 104 and/or the data from information provider 106, to a user through a variety of different distribution mechanisms. For example, content distributor 102 may broadcast the content through over-the-air signals via transmission tower 112. In other situations, content distributor 102 may provide content to other users via communication network 110 or via a satellite (not illustrated).

Host device 114 is a content receiving device that is on host premises 120 and is configured to receive content from content distributor 102. In some embodiments, host device 114 may be part of or separate from a television receiver. The host device 114 receives content via over-the-air reception antenna 126, transcodes the content into a television-white-space channel, and retransmits the content to user premises 122 via wireless local area network transmission antenna 128, such as over Wi-Fi using IEEE 802.11af signals. The Wi-Fi signal output by the host 114 might be a Super Wi-Fi of a type known in the art. Super Wi-Fi signals generally have a range of about 100 kilometers. The host device 114 will be in a location that has good reception for the antenna 126 when it is receiving an over-the-air broadcast signal from tower 112. The host device 114 includes a transmit circuit that has the power output capabilities to drive the antenna 128 for outputting a signal that can be transmitted for an extended range, such as over 80 kilometers. This signal is provided to antenna 128, from which it is broadcast. In some embodiments, antennas 126 and 128 may be a same physical antenna or separate physical antennas.

Television receiver 132 is a receiving device that is on the user premises 122 and is configured to receive content from the host device 114. In some embodiments, television receiver 132 may be referred to as a user device or user television receiver because this device provides the received content to a display device for consumption by an end user. Television receiver 132 receives content via wireless local area network reception antenna 130, decodes the content, and provides it to display device 124. Display device 124 may be a television, monitor, or other display device. Although FIG. 1 illustrates the television receiver 132 providing content for display on the display device 124 on the user premises 122, embodiments are not so limited. In some other embodiments, the television receiver 132 provides the content to a user's mobile device, such as a smartphone, tablet, or other computing device, that is at a remote location to the user premises 122. The antenna 130 of the user will be in a location that can receive the Wi-Fi signal, but cannot receive the over-the-air broadcast signal. The user is therefore able to receive over-the-air broadcast signals that in the past, he has not been able to receive.

Examples of host device 114 or television receiver 132 may include, but are not limited to, a set-top box, a computer, a router, or other content receiver.

Figure 2:
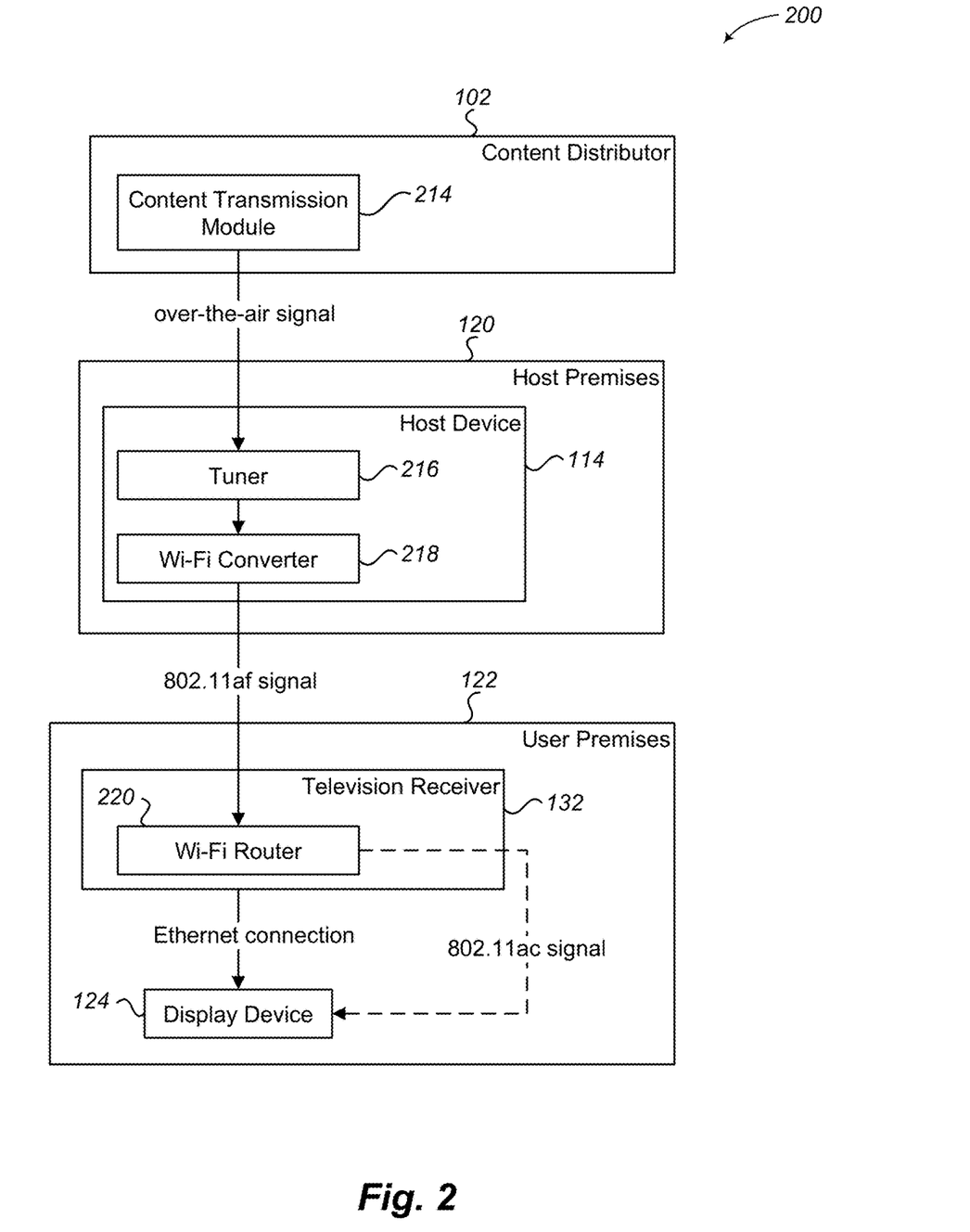
FIG. 2 is a diagram of one non-limiting embodiment of a system for utilizing a host device to retransmit over-the-air television in accordance with embodiments described herein.

FIG. 2 is a diagram of one non-limiting embodiment of a system for utilizing a host device to retransmit over-the-air television in accordance with embodiments described herein. Example 200 includes content distributor 102, host premises 120, and user premises 122. Content distributor 102 includes content transmission module 214. Host premises 120 includes host device 114, which includes tuner 216 and Wi-Fi converter 218. User premises 122 includes display device 124 and television receiver 132, which includes Wi-Fi router 220.

Content transmission module 214 provides an over-the-air television signal, which is received by tuner 216 in host device 114 on host premises 120. The tuner 216 may decode the over-the-air signal and provide it to Wi-Fi converter 218. Wi-Fi converter 218 determines which television-white-space channel to utilize for providing the received content to television receiver 132 on user premises 122. Wi-Fi converter 218 generates or reformats the received content into IP packets that can be provided to Wi-Fi router 220 over a wireless local area network. In various embodiments, Wi-Fi converter 218 sends the received content to Wi-Fi router 220 using the determined television-white-space channel via 802.11af signals. Wi-Fi converter 218 and tuner 216 may be separate components, or their functionality may be combined into a single component.

Wi-Fi router 220 receives the content over 802.11af and provides the content to display device 124. In some embodiments, Wi-Fi router 220 provides the content to display device 124 via an Ethernet connection. In other embodiments, Wi-Fi router 220 transcodes the received content into another wireless signal, such as 802.11ac signals, and provides it to display device 124. Although FIG. 2 illustrates Wi-Fi router 220 as being a component of television receiver 132, embodiments are not so limited. In other embodiments, Wi-Fi router 220 may be a standalone device that is separate and distinct from television receiver 132. In yet other embodiments, television receiver 132 may be a component that is built in to display device 124. Television receiver 132 may output digital or analog audio/video signals to the display device 124, as illustrated, or to another device for further processing.

The operation of certain aspects of the invention will now be described with respect to FIGS. 3 and 4. Process 300 described in conjunction with FIG. 3 may be implemented by or executed on a television receiver, such as television receiver 132 in FIG. 1. Process 400 described in conjunction with FIG. 4 may be implemented by or executed on a host device, such as host device 114 in FIG. 1. In various implementations, the television receiver is geographically located in an area that cannot receive sufficiently clear over-the-air television signals from a content distributor, but the host device is geographically located in an area that can both receive the over-the-air television signals and communicate with the television receiver over a wireless local area network, such as using the IEEE 802.11af standard.

Figure 3:
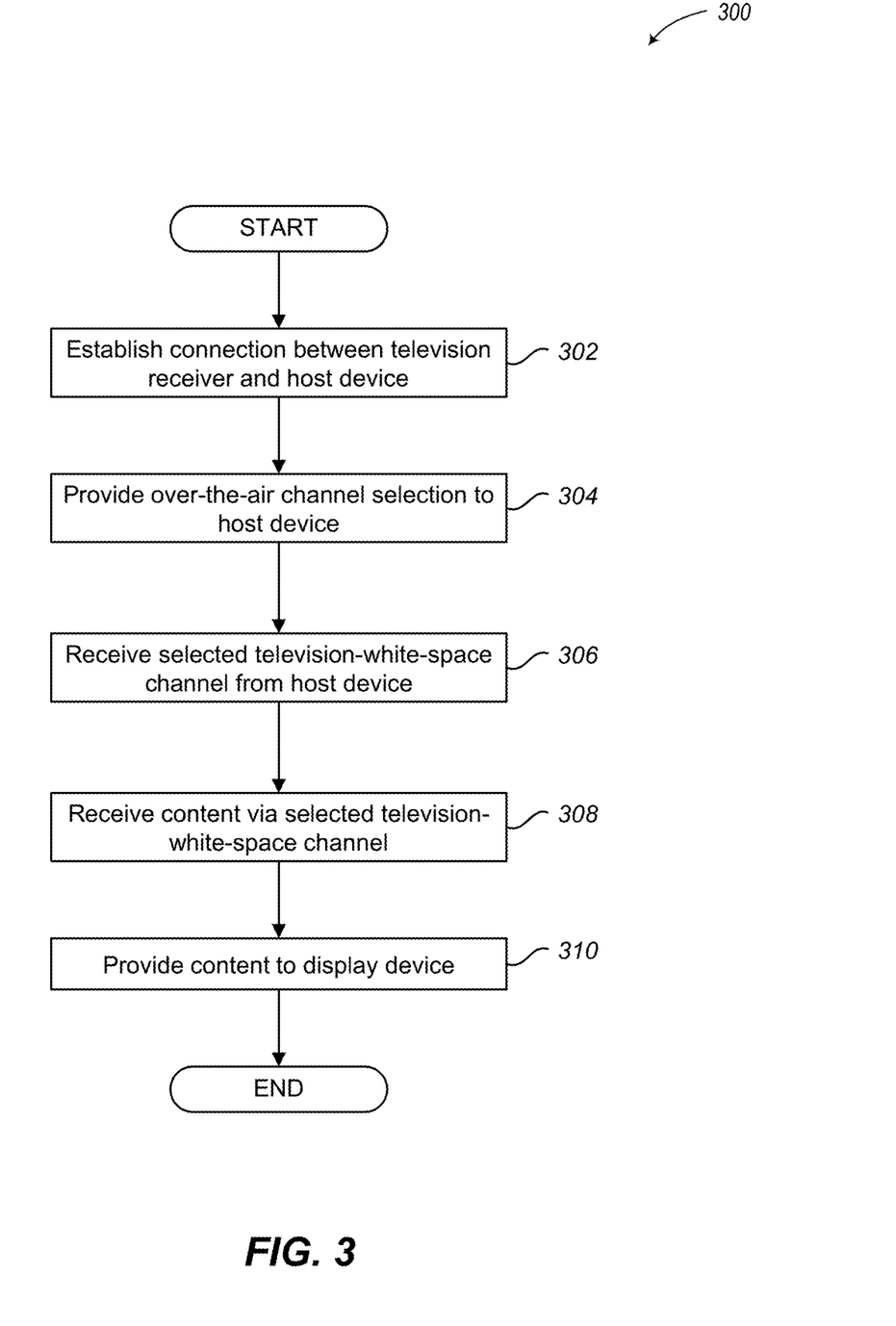
FIG. 3 illustrates a logical flow diagram generally showing one embodiment of a process employed by a television receiver for receiving and displaying retransmitted content in accordance with embodiments described herein.

FIG. 3 illustrates a logical flow diagram generally showing one embodiment of a process employed by a television receiver for receiving and displaying the retransmitted content in accordance with embodiments described herein. Process 300 begins, after a start block, at block 302, where the television receiver establishes a wireless local area network connection with the host device. In various embodiments, the television receiver and the host device may communicate using the IEEE 802.11af standard, which may be referred to as Super Wi-Fi.

In various embodiments, the host device may broadcast its networking identification information. The television receiver can search for this information and respond to the host device with a request to establish a connection. In other embodiments, a user may input the networking information into the television receiver from which the television receiver can send a connection request to the host device. In some embodiments, the request includes the networking identification information of the television receiver. The television receiver can exchange other connection information, such as encryption keys or other networking information, with the host device to establish the connection between the devices.

Process 300 proceeds to block 304, where the television receiver provides an over-the-air channel selection to the host device. In various embodiments, a user of the television receiver selects an over-the-air channel from which the user intends to receive content. This over-the-air channel may be the normal television channel that a user would turn to on their television to view typical over-the-air content. For example, the user may select "channel 13" on the television receiver. In some embodiments, the user may select the over-the-air channel using a remote control or other user interface on the television receiver. The television receiver provides this channel information to the host device via the established connection.

Process 300 continues at block 306, where the television receiver receives an identity or identifier of the selected television-white-space channel from the host device. The television-white-space channel is selected by the host device at block 406 in FIG. 4. In various embodiments, the television receiver stores the selected television-white-space channel so that it knows which television-white-space channel will be used to transmit content from the host device to the television receiver. In other embodiments, the television receiver may not receive the identity of the selected television-white-space channel from the host device. Rather, the television receiver may operate in an automatic mode that scans a plurality of available whitespace channels for content provided by the host device.

In various embodiments, the television receiver may determine or otherwise obtain its physical location on the Earth. In some embodiments, the television receiver may have a built-in GPS receiver that is enabled to provide the television receiver with its location. In other embodiments, the television receiver may include a user interface where a user can enter the location of the television receiver.

In some embodiments, the television receiver can use its location to query a geolocation database for which television-white-space channels are available in the television receiver's area. The geolocation database provides an identification of any available whitespace channels to the television receiver. In this way, the television receiver can determine whether it can receive content via the television-white-space channel selected by the host device or whether another device is already utilizing that particular television-white-space channel. If the television receiver is unable to receive content via the selected television-white-space channel, then it notifies the host device to select a different television-white-space channel. In at least one embodiment, the television receiver may provide the host device with a list of television-white-space channels that the television receiver can utilize. The host device can then select a television-white-space channel from the list provided by the television receiver if that television-white-space channel is also available to the host device, as described in block 406 in FIG. 4.

Process 300 proceeds to block 308, where the television receiver receives content from the host device via the selected television-white-space channel. In various embodiments, the content is transmitted from the host device to the television receiver via IEEE 802.11af signals using the selected television-white-space channel. As indicated above, in some embodiments the television receiver knows which television-white-space channel includes the content, while in other embodiments the television receiver scans available television-white-space channels for the content.

Process 300 continues next at block 310, where the television receiver provides the content to a display device. In some embodiments, the television receiver decodes the received content and provides it to a television or other display device 124 via a wired connection. In other embodiments, the television receiver transcodes the received content into another wireless local area network format. For example, the television receiver may convert the content from an IEEE 802.11af signal into an IEEE 802.11ac signal, which is locally communicated on the user's home Wi-Fi network to the display device 124.

After block 310, process 300 may terminate or returns to a calling process to perform other actions.

Figure 4:
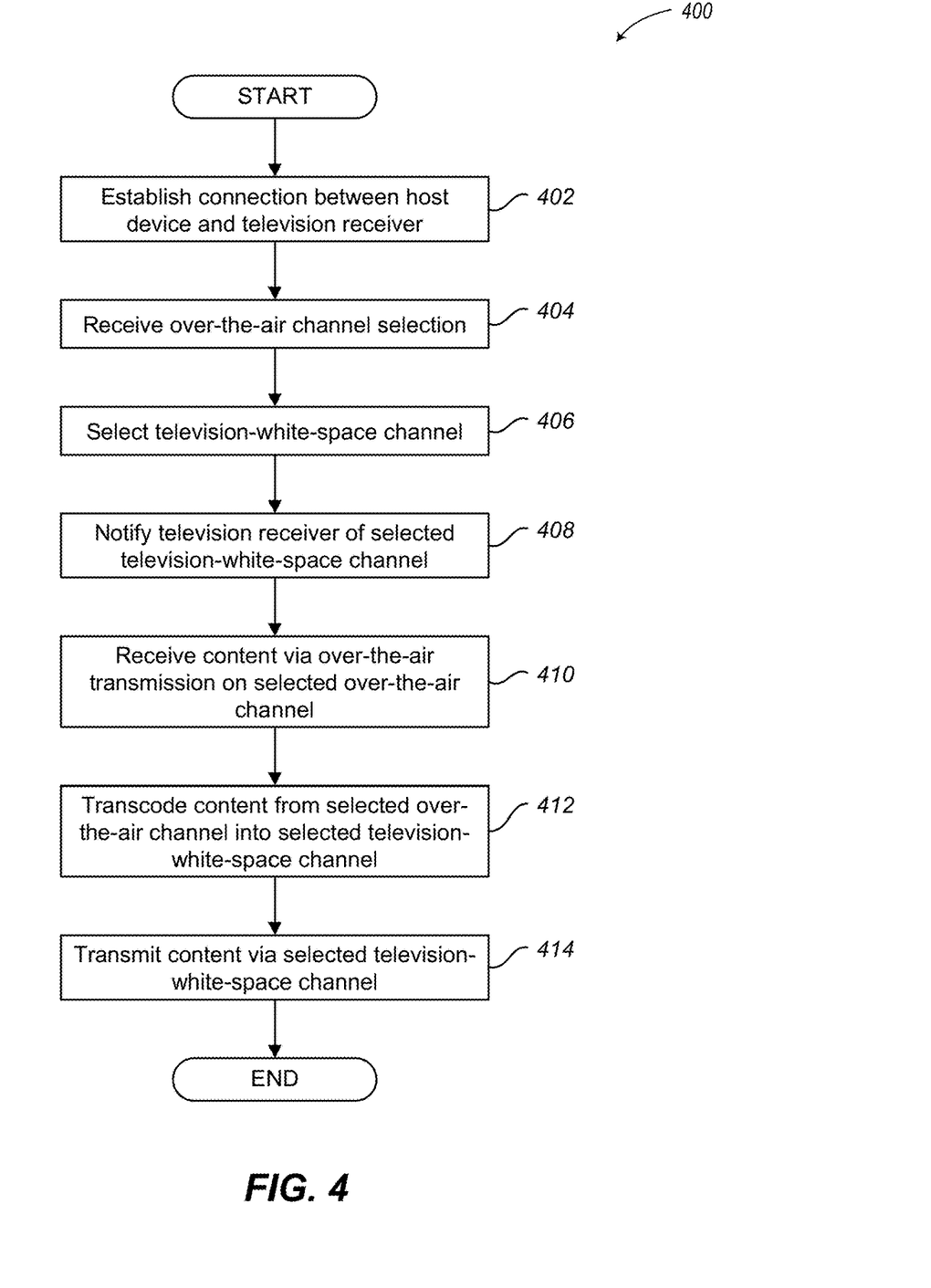
FIG. 4 illustrates a logical flow diagram generally showing one embodiment of a process employed by a host device to retransmit over-the-air television content in accordance with embodiments described herein.

FIG. 4 illustrates a logical flow diagram generally showing one embodiment of a process employed by a host device to retransmit over-the-air television content in accordance with embodiments described herein. Process 400 begins, after a start block, at block 402, where the host device establishes a wireless local area connection with a television receiver of an end user. The host device may broadcast its networking identification information, which can be received and responded to by the television receiver. In other embodiments, the host device may not broadcast its networking information; rather, a user is provided the networking information through a different communication mechanism, such as text message, email, postal mail, or other communication technologies. As described above, the television receiver sends a connection request to the host device.

Upon receipt of a request to establish a connection from the television receiver, the host device and the television receiver can exchange further information to establish the connection between the host device and the television receiver.

Process 400 continues at block 404, where the host device receives a selection of an over-the-air channel from the television receiver. As described above at block 304 of FIG. 3, the television receiver sends a selected over-the-air channel to the host device.

Process 400 proceeds to block 406, where the host device selects a television-white-space channel. In various embodiments, the host device determines or otherwise obtains its physical location on the Earth. In some embodiments, the host device may have a built-in GPS receiver that is enabled to provide the host device with its location. In other embodiments, the host device may include a user interface where a user can enter the location of the host device.

Once the host device has its location, it queries a geolocation database for which television-white-space channels are available in the host device's area. The geolocation database provides an identification of any available whitespace channels to the host device. The host device can store the available whitespace channels for future use, but it may also periodically or at predetermined times re-query the geolocation database for updates to the available whitespace channels.

The host device selects one of the available whitespace channels from which to broadcast content to the television receiver. In various embodiments, the host device may broadcast content to a plurality of separate television receivers. In some embodiments, the whitespace channel may be selected for a specific television receiver, which can allow for the host device to use one television-white-space channel for one television receiver and a separate television-white-space channel for a separate television receiver. So, if a user changes the over-the-air channel, the host device can use the same television-white-space channel to transmit content from the new over-the-air channel to the television receiver.

In other embodiments, a single whitespace channel may be selected for a plurality of television receivers. For example, if multiple different television receivers are requesting content from a same over-the-air channel, then the host device can select a single television-white-space channel to use for retransmitting the same over-the-air content to a plurality of different television receivers. In at least one of various embodiments, the host device may notify the geolocation database of the television-white-space channel that it selects to use.

If there are enough television-white-space channels available to the host device, the host device may select a separate television-white-space channel for each separate available over-the-air channel. The host device may create a mapping from a plurality of over-the-air channels to corresponding television-white-space channels, and provide this mapping to the television receiver.

In yet other embodiments, the host device can map a plurality of over-the-air channels into a single television-white-space channel. The host device can capture content from a plurality of different over-the-air channels and multiplex them together into a single white-space channel. The number of over-the-air channels that are multiplexed together may depend on the resolution of the over-the-air channels and the bandwidth available to the television-white-space channel. The over-the-air channels to multiplex may be automatically selected by the host device or individually selected by a plurality of separate television receivers. Each television receiver can de-multiplex the television-white-space channel to obtain content from one of the over-the-air channels. In this way, the host device can provide separate content to a plurality of separate television receivers without utilizing separate whitespace channels for each separate television receiver, which can reduce the number of whitespace channels used by the host device in a particular area. Similarly, using multiplexed over-the-air channels into a single whitespace channel can allow a user to change from one of the multiplexed over-the-air channels to a different one of the multiplexed over-the-air channels without having the television receiver request a different over-the-air channel from the host device.

Process 400 continues next at block 408, where the host device notifies the television receiver of the selected television-white-space channel. In some embodiments, the host device may select the television-white-space channel and notify the television device of the selected television-white-space channel in response to receiving the selected over-the-air channel from the television receiver. In other embodiments, the host device may select the television-white-space channel and notify the television device of the selected television-white-space channel before the host device ever receives a selected over-the-air channel from the television receiver. In this way, each of a plurality of television receivers obtaining content from the host device can pre-coordinate a dedicated whitespace channel with the host device, which can reduce the number of times that the host device has to select a television-white-space channel and provide it to the television receiver. But in some implementations where changes can occur to the television-white-space channels that are available to the host device, the host device may recheck the available television-white-space channels each time a television receiver requests over-the-air content.

Process 400 proceeds next at block 410, where the host device receives content via over-the-air transmission on the selected over-the-air channel.

Process 400 continues at block 412, where the host device transcodes the received content from the selected over-the-air channel into the selected television-white-space channel. In at least one embodiment, transcoding the content includes decoding the received content and reformatting or encoding the content into an IEEE 802.11af signal using the selected whitespace channel. Process 400 proceeds at block 414, where the transcoded content is transmitted from the host device to the television receiver over the established connection via the selected television-white-space channel. In various embodiments, the host device sends the received content to the television receiver using the IEEE 802.11af standard.

After block 414, process 400 may terminate or return to a calling process to perform other actions.

Figure 5:
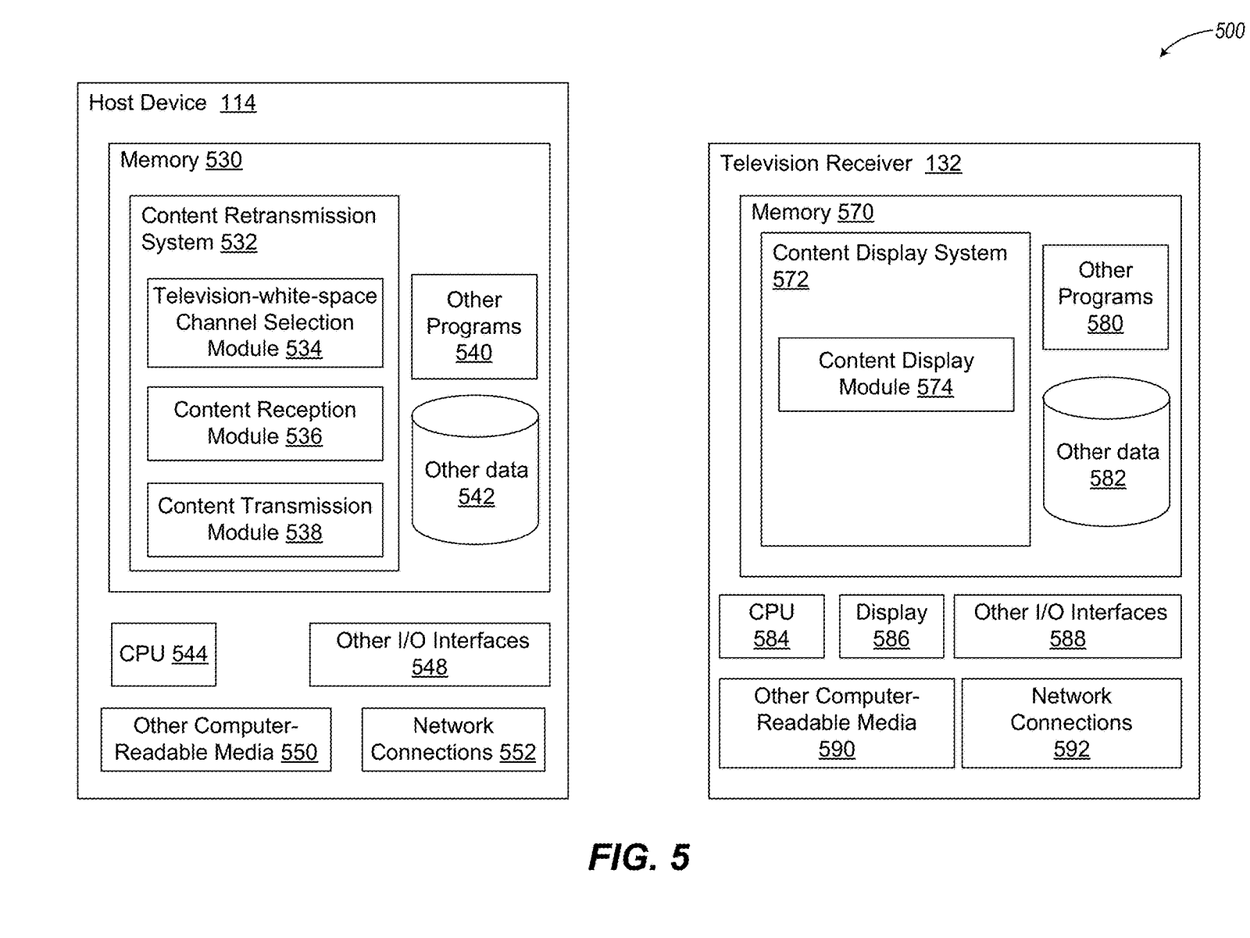
FIG. 5 shows a system diagram that describes one implementation of computing systems for implementing embodiments described herein.

FIG. 5 shows a system diagram that describes one implementation of computing systems for implementing embodiments described herein. System 500 includes host device 114 and television receiver 132.

Host device 114 receives content from a content distributor, not shown for ease of illustration, via over-the-air transmissions, transcodes the received content into a wireless local area network signal using a television-white-space channel described in the IEEE 802.11af standard, and provides the transcoded signal to television receiver 132, as described herein. One or more general-purpose or special-purpose computing systems may be used to implement host device 114. Accordingly, various embodiments described herein may be implemented in software, hardware, firmware, or in some combination thereof. Host device 114 may include memory 530, one or more central processing units (CPUs) 544, other I/O interfaces 548, other computer-readable media 550, and network connections 552.

Memory 530 may include one or more various types of non-volatile and/or volatile storage technologies. Examples of memory 530 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 530 may be utilized to store information, including computer-readable instructions that are utilized by CPU 544 to perform actions, including embodiments performed by a host device as described herein.

Memory 530 may have stored thereon content retransmission system 532, which includes television-white-space channel selection module 534, content reception module 536, and content transmission module 538. The television-white-space channel selection module 534 may employ embodiments described herein to determine the location of the host device 114, access a geolocation database to determine which television-white-space channels are available to the host device 114, and select one of the available whitespace channels for distributing content to the television receiver 132. The content reception module 536 may employ embodiments described herein to receive content via over-the-air transmissions and decode the content as appropriate. The content reception module 536 may utilize network connections 552 to receive over-the-air signals from an antenna, not illustrated. The content transmission module 538 may employ embodiments described herein to convert the received content into a wireless local area network signal for transmission to the television receiver 132 using the IEEE 802.11af standard. The content transmission module 538 may utilize network connections 552 to transmit the converted content to the television receiver 132 over the wireless local area network using the selected television-white-space channel. Memory 530 may also store other programs 540 or other data 542, such as the location of the host device 114 or available whitespace channels.

Network connections 552 are configured to communicate with other computing devices via one or more networks that are not illustrated. Other I/O interfaces 548 may include a keyboard, audio interfaces, other video interfaces, or the like. Other computer-readable media 550 may include other types of stationary or removable computer-readable media, such as removable flash drives, external hard drives, or the like.

Television receiver 132 requests content from host device 114 via an over-the-air channel, receives the content from the host device 114 via a wireless local area network connection using the IEEE 802.11af standard, and provides the received content to a display device, as described herein. One or more general-purpose or special-purpose computing systems may be used to implement television receiver 132. Accordingly, various embodiments described herein may be implemented in software, hardware, firmware, or in some combination thereof. Television receiver 132 may include memory 570, one or more central processing units (CPUs) 584, display interface 586, other I/O interfaces 588, other computer-readable media 590, and network connections 592.

Memory 570 may include one or more various types of non-volatile and/or volatile storage technologies. Examples of memory 570 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 570 may be utilized to store information, including computer-readable instructions that are utilized by CPU 584 to perform actions, including embodiments performed by a television receiver as described herein.

Memory 570 may have stored thereon content display system 572, which includes content display module 574. The content display module 574 receives content over the wireless local area network via the selected television-white-space channel and provides it to a display device, such as display device 124 in FIG. 1. In some embodiments, the content may be provided to the display device via display interface 586, which may include a wire connection between the television receiver 132 and the display device. In other embodiments, the content may be transcoded from IEEE 802.11af signals into IEEE 802.11ac signals and provided to the display device via network connections 592 using a user's local Wi-Fi network. Memory 570 may also store other programs 580 or other data 582.

Display interface 586 is configured to provide content to a display device, such as display device 124 in FIG. 1. Network connections 592 are configured to communicate with other computing devices via one or more networks that are not illustrated. Other I/O interfaces 588 may include a keyboard, audio interfaces, other video interfaces, or the like. Other computer-readable media 590 may include other types of stationary or removable computer-readable media, such as removable flash drives, external hard drives, or the like.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
 a host device, comprising:
  a first memory for storing first instructions; and
  a first processor that executes the first instructions to:
   establish wireless connections over a wireless local area network with a plurality of user devices;
   receive a plurality of over-the-air channel selections from the plurality of user devices;
   receive a plurality of lists of television-white-space channels from the plurality of user devices, each respective list identifies which television-white-space channels are available to each respective user device;

select a single television-white-space channel that is commonly available in each of the plurality of lists of television-white-space channels;

determine if the selected television-white-space channel is available to the host device;

receive content from a content distributor via over-the-air transmissions on the plurality of selected over-the-air channels;

in response to determining that the selected television-white-space channel is available to the host device, multiplex the content from the plurality of selected over-the-air channels into the selected television-white-space channel; and transmit the multiplexed content over the wireless connections of the wireless local area network via the selected television-white-space channel to each of the plurality of user devices; and each of the plurality of user devices, comprising:

a second memory for storing second instructions; and a second processor that executes the second instructions to:

establish a corresponding wireless connection over the wireless local area network with the host device;

generate a list of one or more television-white-space channels that are available to that user device;

provide the list of television-white-space channels to the host device;

provide a corresponding over-the-air channel selection to the host device;

receive the selected television-white-space channel from the host device;

receive the multiplexed content from the host device over the corresponding wireless connection of the wireless local area network via the selected television-white-space channel;

de-multiplex the multiplexed content to obtain content associated with the corresponding over-the-air channel selection; and provide the obtained content to a display device for display to a user.

2. The system of claim 1, the first processor of the host device further executes the first instructions to transmit the multiplexed content in IEEE 802.11af standard from the host device to the plurality of user devices.

3. The system of claim 1, further comprising:

the first processor of the host device further executes the first instructions to:

generate a mapping from a plurality of over-the-air channels to a plurality of television-white-space channels; and provide the mapping from the host device to the plurality of user devices, wherein the selected television-white-space channel corresponds to the selected over-the-air channels in the mapping; and the second processor of the plurality of user devices further executes the second instructions to store the mapping of the plurality of over-the-air channels to the plurality of television-white-space channels.

4. The system of claim 1, the first processor of the host device further executes the first instructions to select the television-white-space channel for the plurality of user devices that each requested content from a same selected over-the-air channel.

5. The system of claim 1, the first processor of the host device further executes the first instructions to:

receive another selected over-the-air channel for other content from a user device of the plurality of user devices;

multiplex the other content from the other selected over-the-air channel with the content from the plurality of selected over-the-air channels into the selected television-white-space channel for transmission over the wireless local area network; and transmit the multiplexed other content over the wireless local area network via the selected television-white-space channel to the user device for display to the user.

6. The system of claim 1, the first processor of the host device further executes the first instructions to:

receive another selected over-the-air channel for other content from a user device of the plurality of user devices;

select another television-white-space channel from the list of television-white-space channels provided by the user device;

provide the other selected television-white-space channel to the user device;

transcode the other content from the other selected over-the-air channel into the other selected television-white-space channel for transmission over the wireless local area network; and transmit the transcoded other content over the wireless local area network via the other selected television-white-space channel to the user device for display to the user.

7. The system of claim 1, the second processor of the plurality of user devices further executes the first instructions to:

transcode the obtained content from its received format into a format associated with another wireless local area network; and transmit the transcoded content to the display device via the other wireless local area network.

8. A method, comprising:

establishing corresponding wireless connections over a wireless local area network between a host device and a plurality of television receivers;

receiving at the host device a separate over-the-air channel selection from each of the plurality of television receivers;

receiving at the host device a list of television-white-space channels from each of the plurality of television receivers, each list identifies which television-white-space channels are available to each respective television receiver;

determining, by the host device, that the over-the-air channel selections received from each of the plurality of television receivers are for a same over-the-air channel;

determining if a particular television-white-space channel is listed as being available in each of the lists of television-white-space channels;

determining if the particular television-white-space channel is available for use by the host device;

in response to determining that the particular television-white-space channel is available in each of the lists of television-white-space channels and is available for use by the host device, selecting the particular television-white-space channel from the lists of television-white-space channels to be used to transmit content to each of the plurality of television receivers;

receiving, at the host device, content from a content distributor via an over-the-air transmission on the selected over-the-air channel;

transcoding the content from the selected over-the-air channel into the selected television-white-space channel for transmission over the wireless local area network; and transmitting the transcoded content over the wireless local area network via the corresponding wireless connections using the selected television-white-space channel to each of the plurality of television receivers for display to users of the plurality of television receivers.

9. The method of claim 8, wherein transmitting the transcoded content over the wireless local area network includes transmitting the transcoded content in IEEE 802.11af standard from the host device to the television receiver.

10. The method of claim 8, further comprising:
generating a mapping from a plurality of over-the-air channels to a plurality of television-white-space channels that are available to the host device; and
providing the mapping from the host device to the television receiver, wherein the selected television-white-space channel corresponds to the selected over-the-air channel in the mapping.

11. The method of claim 8, further comprising:
receiving, at the host device, a plurality of content via a plurality of over-the-air channels, the plurality of over-the-air channels includes the selected over-the-air channel;
multiplexing the plurality of content into the selected television-white-space channel for transmission over the wireless local area network, the plurality of content includes the content from the selected over-the-air channel; and
transmitting the multiplexed content over the wireless local area network via the selected television-white-space channel to the plurality of television receivers for de-multiplexing to obtain the content from the selected over-the-air channel and displaying to a user.

12. The method of claim 8, further comprising:
receiving another selected over-the-air channel from the plurality of television receivers;
transcoding other content from the other selected over-the-air channel into the selected television-white-space channel for transmission over the wireless local area network; and
transmitting the transcoded other content over the wireless local area network via the selected television-white-space channel to the plurality of television receivers for display to the users.

13. The method of claim 8, further comprising:
receiving another selected over-the-air channel for other content from a television receiver of the plurality of television receivers;
selecting another television-white-space channel from the list of television-white-space channels received from the television receiver;
providing the other selected television-white-space channel to the television receiver;
transcoding the other content from the other selected over-the-air channel into the other selected television-white-space channel; and
transmitting the transcoded other content over the wireless local area network via the other selected television-white-space channel to television receiver for display to the user of the television receiver.

14. A method, comprising:
establishing a wireless connection over a wireless local area network between a host device and a television receiver;
generating, at the television receiver, a list of a plurality of television-white-space channels that are available to the television receiver;
providing the list of television-white-space channels to the host device;
receiving, at the television receiver and from the host device, a mapping between one or more over-the-air channels and one or more television-white-space channels that are available in both the list of television-white-space channels provided to the host device from the television receiver and also in another list of television-white-space channels provided to the host device from another television receiver, the other list of television-white-space channels indicating television-white-space channels that are available to the other television receiver;
selecting, at the television receiver, an over-the-air channel from the one or more over-the-air channels from which to view content;
providing the selected over-the-air channel to the host device;
receiving, at the television receiver and from the host device, content over the wireless local area network via a television-white-space channel of the one or more television-white-space channels that maps to the selected over-the air channel; and
providing the received content to a display device for display to a user.

15. The method of claim 14, wherein receiving the content over the wireless local area network comprises receiving the content from the host device using IEEE 802.11af standard and the television-white-space channel.

16. The method of claim 14, wherein providing the received content to the display device comprises:
decoding the content; and
providing the decoded content to the display device via a wired connection.

17. The method of claim 14, wherein providing the received content to the display device comprises:
transcoding the content from its received format into a format associated with another wireless local area network; and
transmitting the transcoded content to the display device via the other wireless local area network.

18. The method of claim 14, further comprising:
receiving an identifier of the television-white-space channel from the host device; and
utilizing the identifier to receive the content over the wireless local area network via the television-white-space channel.

19. The method of claim 14, further comprising:
providing another selected over-the-air channel for other content to the host device; and
receiving, at the television receiver and from the host device, the other content over the wireless local area network via another television-white-space channel of the one or more television-white-space channels that maps to the other selected over-the-air channel.

20. The method of claim 14, further comprising:
scanning, by the television receiver, one or more television-white-space channels for the content from the host device.

* * * * *